(12) United States Patent
Seuser et al.

(10) Patent No.: US 8,925,693 B2
(45) Date of Patent: Jan. 6, 2015

(54) BRAKE DISC AND DISC BRAKE

(75) Inventors: Ulrich Seuser, Neuwied (DE); Michael Rychlik, Rennerod (DE); Serdar Seyhun, Wesseling (DE); Jürgen Korte, Holzappel (DE)

(73) Assignee: Lucas Automotive GmbH, Koblenz (DE)

( * ) Notice: Subject to any disclaimer, the term of this patent is extended or adjusted under 35 U.S.C. 154(b) by 361 days.

(21) Appl. No.: 12/935,666

(22) PCT Filed: Apr. 1, 2009

(86) PCT No.: PCT/EP2009/002384
§ 371 (c)(1),
(2), (4) Date: Dec. 9, 2010

(87) PCT Pub. No.: WO2009/121586
PCT Pub. Date: Oct. 8, 2009

(65) Prior Publication Data
US 2011/0100774 A1    May 5, 2011

(30) Foreign Application Priority Data
Apr. 1, 2008    (EP) ..................... 08006702

(51) Int. Cl.
*F16D 65/12* (2006.01)
*F16D 65/847* (2006.01)
*F16D 65/02* (2006.01)

(52) U.S. Cl.
CPC ............ *F16D 65/128* (2013.01); *F16D 65/847* (2013.01); *F16D 2065/1328* (2013.01)
USPC ........... 188/264 AA; 188/264 A; 188/218 XL

(58) Field of Classification Search
CPC ..... F16D 65/128; F16D 65/827; F16D 65/84; F16D 65/847; F16D 65/78; F16D 65/807; F16D 65/12; F16D 65/123; F16D 2065/1328; F16D 2065/1316
USPC .... 188/71.6, 218 XL, 264 A, 264 AA, 264 R
See application file for complete search history.

(56) References Cited

U.S. PATENT DOCUMENTS

| | | | |
|---|---|---|---|
| 2,629,464 A | 2/1953 | Helsten | |
| 2,800,982 A | 7/1957 | Cottrell | |
| 3,892,297 A | 7/1975 | Brownyer | |
| 4,712,656 A * | 12/1987 | Courtois | .................. 188/218 X |
| 5,460,249 A | 10/1995 | Aoki | |
| 6,564,912 B1 * | 5/2003 | Koschinat | ................. 188/218 X |
| 2004/0124047 A1 * | 7/2004 | Oberti et al. | .............. 188/218 X |

(Continued)

FOREIGN PATENT DOCUMENTS

| | | |
|---|---|---|
| DE | 1283611 B | 11/1968 |
| DE | 1950178 A1 | 4/1971 |

(Continued)

*Primary Examiner* — Bradley King
*Assistant Examiner* — Stephen Bowes
(74) *Attorney, Agent, or Firm* — MacMillan, Sobanski & Todd, LLC

(57) ABSTRACT

A brake disc has an outer friction path on one side and an inner friction path on the other side. Between the friction paths free spaces are provided, which on the outer friction path side have a different configuration than on the inner friction path side.

3 Claims, 2 Drawing Sheets

(56) References Cited

U.S. PATENT DOCUMENTS

| | | | |
|---|---|---|---|
| 2004/0178031 A1* | 9/2004 | Gotti et al. | 188/218 X |
| 2005/0269173 A1 | 12/2005 | Tedesco et al. | |
| 2006/0243546 A1* | 11/2006 | Oberti et al. | 188/218 X |
| 2006/0243547 A1* | 11/2006 | Keller | 188/218 X |

FOREIGN PATENT DOCUMENTS

| | | | | |
|---|---|---|---|---|
| DE | 2128594 A1 | 1/1973 | | |
| DE | 3026354 A1 | 2/1981 | | |
| DE | 3231175 A1 | 2/1984 | | |
| DE | 4210449 A1 * | 10/1993 | | F16D 65/12 |
| DE | 102004056645 A1 | 6/2006 | | |
| DE | 102007010487 A1 | 11/2007 | | |
| EP | 521754 A1 * | 1/1993 | | F16D 65/12 |
| FR | 1309093 A | 11/1962 | | |
| GB | 2001716 A | 2/1979 | | |
| JP | 59194139 A * | 11/1984 | | |
| WO | 2004102029 A1 | 11/2004 | | |

* cited by examiner

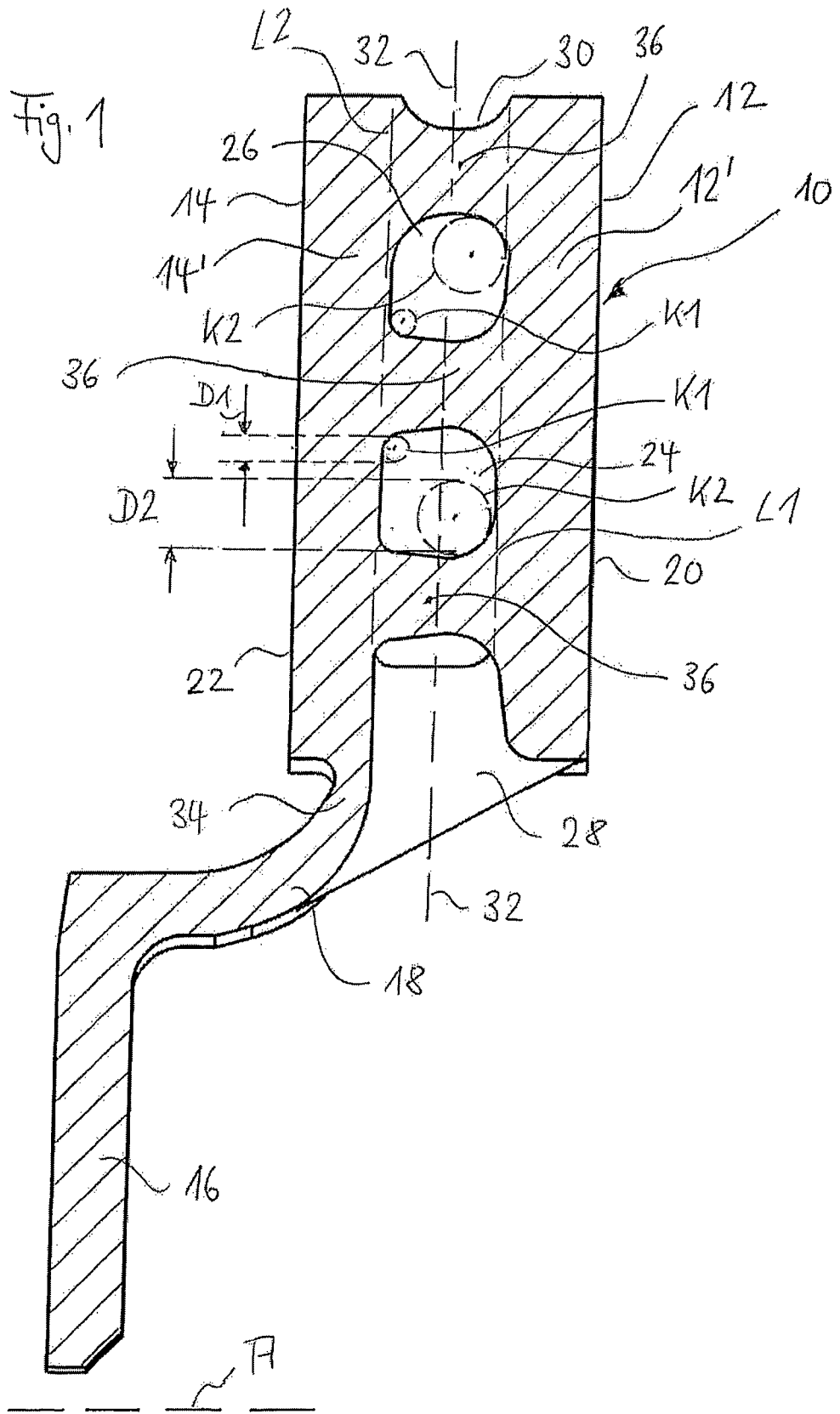

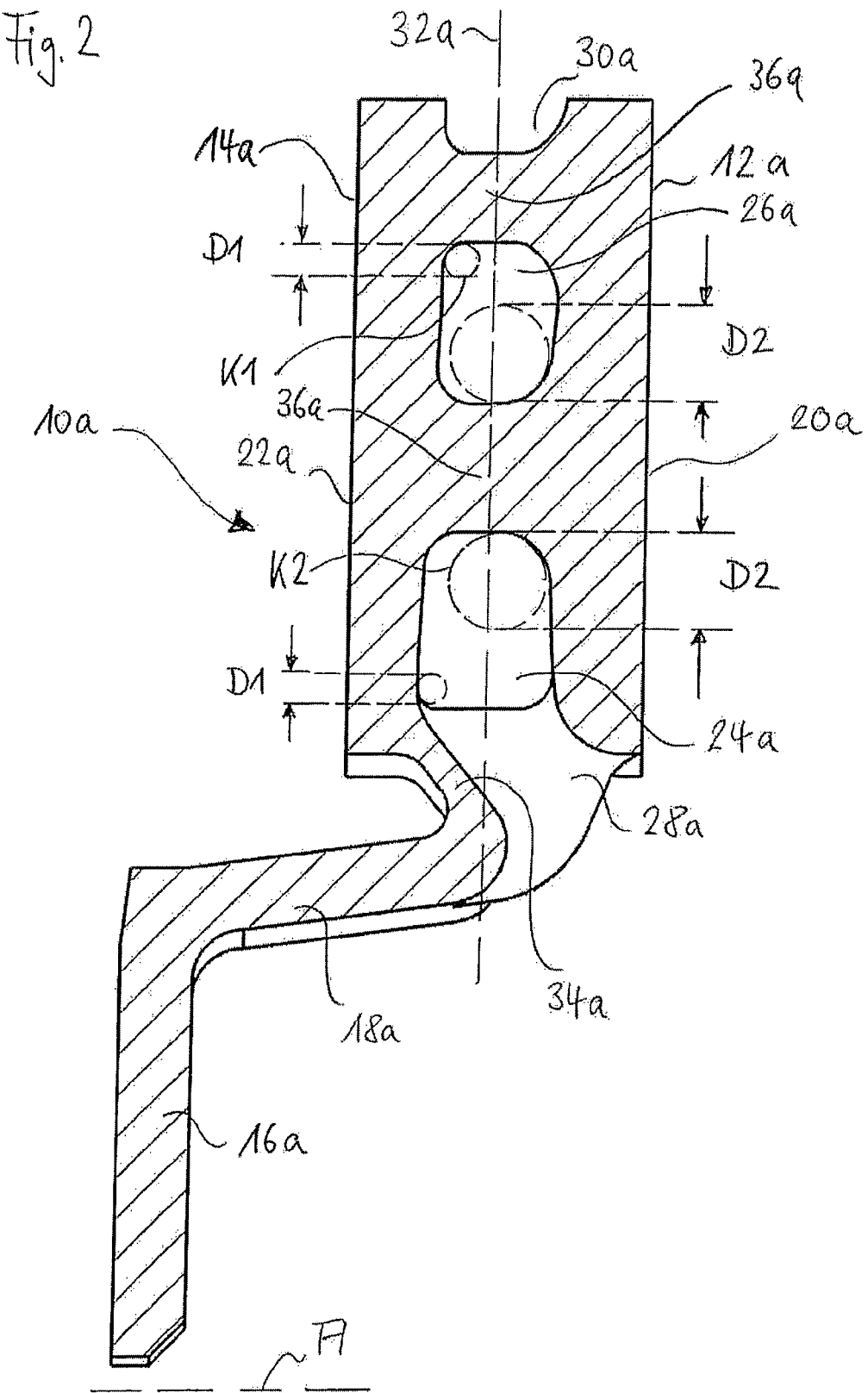

BRAKE DISC AND DISC BRAKE

CROSS-REFERENCE TO RELATED APPLICATIONS

This application is a national stage of International Application No. PCT/EP2009/002384 filed Apr. 1, 2009, the disclosures of which are incorporated herein by reference in entirety, and which claimed priority to European Patent Application No. 08 006 702.8 filed Apr. 1, 2008, the disclosures of which are incorporated herein by reference in entirety.

BACKGROUND OF THE INVENTION

The invention relates to a brake disc for a disc brake, having an outer friction path on one side and an inner friction path on the other side of the brake disc and having air-swept hollows (recesses) between the friction paths for cooling the brake disc, as well as to a disc brake, in which such a brake disc is fitted, the brake disc therefore being a so-called ventilated brake disc.

Such brake discs are known from DE 10 2007 010 487 A1.

In physical terms, the braking operation in a motor vehicle means that its kinetic energy is converted substantially into heat. This heat is generated in the brake and has to be dissipated during the actual braking operation for the most part into the environment. During a total braking operation from higher speeds thermal outputs of 500 kW may arise. If a motor vehicle is braked over an extended time, for example when travelling down from a mountain pass, then thermal outputs in the region of 5 kW typically arise.

The conversion of the kinetic vehicle energy into heat is effected at the friction surfaces of the brake. In the case of a disc brake, these are the friction surfaces between the brake linings and the brake disc.

Heat is removed from the brake disc by radiation, convection and thermal conduction. Nevertheless considerable heating of the brake disc occurs during more extreme and/or extended braking operations. The heating of the brake disc generally does not occur homogeneously over the entire brake disc. Rather, temperature gradients arise and may lead to deformation of the brake disc, in particular to the known so-called umbrella effect, i.e. an arching of the brake disc. Such deformations are highly undesirable. In particular, they may lead to so-called "brake judder".

A further problem that repeatedly has to be solved with disc brakes is so-called brake squeal, which may occur i.e. also because various vibration effects may arise through reciprocal action (coupling) in the brake. For example, there are couplings of the two mechanical sub-systems "caliper" and "brake disc" particularly if their resonant frequencies lie close to one another. This may lead at specific brake forces to a resonant coupling and hence to extremely undesirable squealing noises.

In the initially mentioned DE 10 2007 010 487 A1 an attempt is made to combat the described problems by disposing a compensating ring on a radially inner edge of the friction disc (brake disc). The intention here is to shift the natural frequencies and in particular the axial bending modes towards higher frequencies, thereby making a vibration coupling with other sub-systems of the brake difficult. Radial forces, which act as a result of thermal expansion upon the brake disc, are also to be absorbed in the region of the compensating ring and hence an umbrella effect on the brake disc is to be avoided.

From U.S. Pat. No. 2,629,464 a ventilated brake disc is known, in which the connection of the disc pot to the disc rim is reduced in cross section and has a curvature, a so-called swan neck. The swan neck extends in axial direction (in relation to the axis of rotation of the disc) to a point under the disc rim. The intention here is to adapt the connection between disc pot and disc rim to the expansion and contraction of the disc rim as a result of thermal effects without overstressing the material, in order therefore to avoid crack formation in particular.

From U.S. Pat. No. 2,800,982 a ventilated brake disc is known, in which between radially extending thicker ribs thinner ribs are disposed. The thicker ribs form the supporting connection between inner friction path and outer friction path, while the thinner ribs mainly as a result of surface enlargement are used to dissipate heat. According to a form of construction the thinner ribs are provided radially at the outside and radially at the inside with V-shaped cutouts. In this way, more heat is to be removed from the central region of the friction paths and the overall result is to be that the temperature in the friction rim remains as homogeneous as possible in order to reduce thermal gradients and hence thermal stresses.

From FR 1,309,093 a solid brake disc is known, in which the connection of the brake disc pot is effected approximately centrally in relation to the two friction paths. To combat the umbrella effect, a groove is cut into the region of the connection in such a way that the inner friction path and the outer friction path have approximately the same radial width. By tuning the dimensions of the groove the thermal conduction from the friction paths into the disc pot is to be controlled in such a way that a reduction of the umbrella effect is achieved.

DE 1 283 611 discloses a ventilated brake disc, in which the friction path, which verges directly into the connection to the brake disc pot and from which therefore more heat is removed by thermal conduction than from the other friction path, has a lower wall thickness than the other friction path. The intention here is to achieve a more homogeneous temperature distribution, thereby preventing stresses and cracks in the region of the friction paths.

DE 1 950 178 discloses a ventilated brake disc, in which the friction path that verges directly into the connection to the brake disc pot has a greater wall thickness than the other friction path. The intention here is that cracks due to thermal stress may occur only after a very long operating period and very extraordinary stresses. The reason for this that is cited there is that the strengthened wall of the friction path, which in the operating state is situated in the wheel disc and from which the air heated during braking may be only incompletely dissipated, is better able to withstand the high specific heat loads and ensures a more uniform heat distribution in the disc body. Here, in order to prevent extreme warping of the brake disc, a groove is provided also in the region of the connection of the outer friction path to the brake disc pot.

DE 2 128 594 discloses a fully lined disc brake having a solid, i.e. non-ventilated, brake disc, in which the connection of the brake disc pot is effected approximately centrally in relation to the two friction paths (by centrally is meant in axial direction between the friction paths). Between the two friction paths a deep V-shaped groove is cut so that upon actuation of the brake the friction paths spring relative to one another. In the non-actuated state of the brake the friction paths extend, not plane-parallel to one another, but in the shape of a double cone, such that their width at the outside diameter is greater by the extent of the compliance than at their inside diameter. The intention here is to achieve a full surface contact of the friction surfaces of the brake linings and the friction paths in order to achieve a uniform distribution of the contact pressure and hence also of the friction forces and the heating. The uniform thermal load is also to lead to uniform wear of the brake linings. In order to reduce the heat flow on the side of the connection to the pot, the connection is interrupted by a plurality of openings and the wall thickness is reduced.

U.S. Pat. No. 3,892,297 and GB 2 001 716 also deal with the problem of preventing thermal gradients in the brake disc and for this purpose provide different wall thicknesses for the friction paths.

DE 3 026 354 describes a ventilated brake disc having thermal correction masses in the region of the ventilating channels. The outer friction path, which, there, is connected directly to the disc pot, is enlarged in such a way that the mass of the outer friction path including the said thermal correction mass corresponds approximately to the mass resulting from the sum of the masses of brake disc pot, connection of the brake disc pot and transition to the outer friction path. In this way, with regard to the removal of the heat from the outer friction path into the disc pot, which acts as a heat sink, and the associated temperature differences between the radially outer zone and the radially inner zone of the outer friction path a correction is provided to the effect that the heat of the outer friction path flows into the thermal correction mass and hence the temperature differences within the outer friction path are reduced.

DE 3 231 175 discloses i.e. a ventilated brake disc having a V-shaped indentation between the two friction paths. In order upon brake actuation to keep the two friction paths a defined axial distance apart, supporting webs or flat annular bodies are disposed between the friction paths. In this way, the radially outer region of the friction paths is to be heated to a greater extent than the radially inner region, with the result that the outer region expands to a greater extent than the inner region. The intention here is to generate a tensile stress that ensures a tautening of the friction paths in radial direction and hence prevents warping of the brake disc.

WO 2004/102029 A1, and corresponding U.S. Pat. No. 7,703,583 both of which are incorporated by reference herein in entirety, discloses a ventilated brake disc having plates, which form the friction paths and are connected to one another by supporting elements, wherein relatively large free spaces between supporting elements are provided for intensifying the air flow.

U.S. Pat. No. 5,460,249 describes a ventilated brake disc, in which for preventing thermal deformation ribs are provided between the plates forming the friction paths and extend beyond the inner edge of the brake disc.

US 2005/0269173 A1 describes a ventilated brake disc, in which for preventing an outward bending of the brake disc during brake operation a special arrangement of supports is provided between the plates forming the brake disc.

BRIEF SUMMARY OF THE INVENTION

The underlying feature of the invention is to provide a brake disc and a disc brake, with which undesirable thermal and acoustic effects are extensively avoided.

For this purpose the invention provides a brake disc for a disc brake, having an outer friction path on one side and an inner friction path on the other side of the brake disc and having air-swept hollows between the friction paths for cooling the brake disc, wherein the hollows at least partially on the outer friction path side have a different configuration than on the inner friction path side.

In a preferred manner the brake disc comprises a partial plate forming the inner friction path and a further partial plate forming the outer friction path. The two plates are connected by a plurality of column-shaped supporting elements, between which free spaces then remain, which are referred to here also as hollows. With this concept formation the inventive idea may also be formulated such that the said supporting elements on both sides of the brake disc verge with different shapes into the said plates forming the respective friction paths. These transitions between the supporting elements and the plates are configured in such a way that the transfer of heat from the plates forming the friction paths into the free spaces between the supporting elements is different on both sides of the brake disc, namely such that on the side of the brake disc that, without the special development of the said transitions between the supporting elements and the plates, would be heated to a greater extent the heat removal is greater than on the other side of the brake, the overall result being that as homogeneous a heat distribution as possible is achieved in the brake disc and neither friction path is heated to a substantially greater extent than the other friction path.

One possibility of configuring the transitions between the supporting elements and the plates forming the friction paths in the above sense is to make the radii of curvature of the transitions between the supporting elements and the plates on the one side of the brake disc differ from those on the other side of the brake disc. Larger radii of curvature bring about a greater transfer of heat.

The previously described inventive idea may be applied also to brake discs having air-swept hollows that are formed, not by free spaces between supporting elements, but for example by air-swept spiral channels, radially extending cavities etc. With such developments of the hollows it is also possible by means of the described asymmetrical configuration of the wall geometry on both sides of the brake disc to achieve the effect of as homogeneous a temperature distribution as possible in the brake.

According to another development of the invention the homogeneous temperature distribution in the brake disc is promoted by disposing the hollows swept by cooling air, not precisely centrally in the brake disc, but with an axial offset (in relation to the axis of the brake disc) such that the side of the brake disc that without this offset would be heated to a greater extent consequently has the same temperature as, or as similar as possible a temperature to, the other side of the brake disc, on which without the offset of the hollows there would be a greater removal of heat. By means of the different configuration according to the invention of the transition regions between the supporting elements and the plates on both sides of the brake the previously described "offset" of the hollows in relation to the centre plane of the brake disc may be kept relatively slight, with the result that the regrettable risks of the prior art with regard to disc cracks in the case of different friction path thicknesses (i.e. different strengths of the said plates) may be reduced.

The invention also enables monitoring of crack formation at one of the friction paths, in particular at the outer friction path of a brake disc, such that an end of the service life of a brake disc due to crack formation is detectable as non-critically as possible and in a particularly simple manner. For this purpose the said transition regions between the supporting elements and the plates forming the friction paths are configured in such a way that crack formation starts, if at all, from or close to the radial centre of the friction path. In particular, for this purpose the transition radii between the supporting elements and/or the transition shapes between the supporting elements and the plates forming the friction paths are configured differently in the radially inner region of the brake disc than in regions of the brake disc that are situated radially further out. This aspect of the invention, i.e. control of the heating of the brake disc such that the maximum loading of the brake disc occurs in the radially central region of the friction paths and not in the radially inner region of the friction paths, may also be realized per se (as such) independently of the other features of the invention.

The invention makes it possible to homogenize the heat distribution in the friction threads and in the brake disc without a significant weight increase.

This also means that the unsprung weight of the vehicle remains approximately constant.

In realizing the invention with the previously described different radii of curvature in the transition region between the supporting elements and the friction paths, what is important is substantially the difference of the friction radii on both sides of the brake disc. This may be optimized empirically for a given brake disc of specific geometric dimensions. Here, the term "radius of curvature" is not necessarily to be interpreted strictly in the sense of a circle. Deviations from the circular shape are permitted. The essential point is that the curvature in the said region on the one side of the brake disc is different from that on the other side in the previously described sense, such that the heat flow from the, as such, thermally more highly loaded friction path into the supporting elements is better because of the widened thermal bridge than on the other side of the brake disc, where the connection between the friction path and the supporting element forms a thermal bridge of reduced cross section, such that this side of the brake, from which without the described development of the "thermal bridges" a greater heat flow into the brake disc pot occurs, now reaches substantially the same temperature as the opposite side of the brake disc.

In a modification of the previously described embodiments having different radii of curvature on both sides of the centre plane of the disc brake it is also possible to achieve the described technical effects with regard to the desired temperature distribution also in that the transition regions between the supporting elements and the plates forming the friction paths have different bevels, such that on the side that is to be cooled to a greater extent the cross section in the transition region from the friction path plate into the supporting elements for the heat conduction is greater than on the other side, such that the heat removal from the friction path is relatively increased on the side that is to be cooled to a greater extent. The shape in the transition region of the supporting elements into the plates then corresponds to the shape of the hollows (free spaces) and, there, the described different cooling effect is further promoted by different flow conditions of the cooling air on the two sides of the brake disc. The transition regions between the supporting elements and the plates may also be of a polygonal design. The crucial point here, as in the previous embodiments, is that the heat conduction cross section from the friction path, which is to be cooled to a greater extent, to the air-cooled surfaces of the brake disc compensates the greater heat removal of the other friction path, from which more heat is removed as a result of the direct connection to the brake pot.

With the measures according to the invention it is possible to ensure that the brake disc has an umbrella effect of no more than 0.2 mm. In particular it is possible to shift this umbrella effect in the direction of the brake piston (in a floating-caliper disc brake).

The described supporting elements may take different shapes, for example a column shape (having the described asymmetries), rib shape or conical shape, wherein on the one side of the brake disc a larger cone angle is provided than on the other side and the side having the larger cone angle has a greater removal of heat from its friction path.

If the supporting elements are designed in the style of columns or pins, they may have for example diameters in the region of 3.5 to 7 mm, preferably in the region of 4 to 6 mm and particularly preferably in the region of 5 mm. The supporting elements are for example distributed uniformly over the brake disc and have a typical mutual spacing from centre to centre in the region of 10 to 30 mm. Preferably the brake disc as a whole is cast. The previously described variant of the invention, according to which in order to prevent a crack formation in the radially inner region of the friction paths—if crack formation occurs at all—and in order to ensure that such a crack formation starts in the radially central region of the friction paths a specific heat removal from the friction paths is effected in such a way that the heating in the event of extreme braking loads is realized in the radially central region of the friction paths by virtue of the fact that the supporting elements are distributed in a correspondingly non-homogeneous manner over the brake disc, i.e. in the radially central region of the friction linings for example the density of the heat-removing supporting elements is lower than radially further in.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a section through a first embodiment of a brake disc and

FIG. 2 is a section through a second embodiment of a brake disc.

DETAILED DESCRIPTION OF THE INVENTION

The figures show parts of a disc brake that are relevant in the context of the invention, namely the brake disc. The other components of the disc brake, such as the brake anchor plate, the caliper etc., may be gathered from the various developments according to the prior art.

Of the brake disc 10, the section along a radius is shown in FIG. 1. The brake disc therefore rotates about its axis A.

The brake disc 10 has an inner friction path 12 and an outer friction path 14. The inner friction path 12 is formed by an (inner) plate 12' and the outer friction path 14 is formed by an (outer) plate 14'. The brake disc in an, as such, known manner has a brake disc pot 16, by which the fastening to the vehicle part to be braked is effected. This is generally the wheel hub. In vehicles, in which the brake is disposed on the differential gear, the brake disc is connected to a part of the axle drive.

The ventilated brake disc 10 is configured for fastening to a wheel hub. Extending obliquely radially and axially from the brake disc pot 16 is a connection 18 for supporting the brake disc 10. The connection 18 verges into a transition 34, which has a reduced cross section and runs integrally into the plate 14' of the outer friction path 14. In the figures, therefore, left is "outside" and right is "inside", in each case in relation to the intended fitted state of the brake in the vehicle.

Because of the direct connection between the brake disc pot 16, which absorbs and dissipates heat, and the outer friction path 14 there is a greater removal of heat from the outer friction path 14 into the brake disc pot 16 than from the inner friction path 12. Without special measures, therefore, the inner friction path 12 and the plate 12' forming the inner friction path 12 would heat up to a greater extent than the outer friction path 14 and the plate 14' forming the outer friction path 14.

The friction paths 12', 14' at the outside are plane-parallel. In relation to the vehicle, in which the brake is fitted, the side 20 of the brake disc 10 is the inner side and the side 22 the outer side of the brake disc 10, i.e. the side of the brake disc facing outwards, viewed from the vehicle centre.

Formed in the brake disc 10 are hollows 24, 26, which may also be referred to as free spaces between the plates 12', 14'. The hollows 24, 26 in the illustrated embodiment are all connected to one another and interconnected for a free movement of air. This is because the supporting elements 36 are of a pin- or column-shaped configuration, i.e. only in places connect the plates 12', 14' to one another, so that the free spaces 24, 26 are connected for free air circulation along various paths. The air flows, here, radially from the inside out, i.e. passes through an air inlet 28 between the plates 12', 14' and exits from the brake disc 10 radially outwards through the air outlet 30 after having flowed through the free spaces 24, 26 and, in so doing, absorbed heat. In FIG. 1 the two plates 12', 14' are marked by the imaginary dashed lines L1 and L2.

In the embodiment according to FIG. 1 the cooling air, which passes through the air inlet 28 into the brake disc, comes from the region between the vehicle wheel and the vehicle centre. If, on the other hand, the brake disc pot were connected to the inner friction path 12, the cooling air would come from the region between the wheel rim and the outer friction path 14. This would result in a less effective cooling of the brake disc.

If the illustrated brake disc 10 is fitted in a partially lined floating-caliper disc brake, i.e. a disc brake that has a piston-cylinder arrangement on only one side of the brake disc, then the piston-cylinder arrangement is disposed on the side of the inner friction path 12.

The heat generated during braking arises initially at the outer friction path 14 and at the inner friction path 12. From these friction paths the heat flows to the supporting elements 36. Heat additionally flows via the transition 34 and the connection 18 into the brake disc pot 16 and from there into the wheel hub, wherein, as mentioned, in the illustrated form of construction the heat flow into the brake disc pot 16 removes more heat from the outer friction path 14 than from the inner friction path 12.

In order nevertheless to achieve the effect whereby the friction paths have at least approximately identical temperatures, the heat removal from the outer friction path 14 into the supporting elements 36 and into the free spaces 24, 26 is purposefully reduced compared to the heat removal from the inner friction path 12 into the supporting elements 36 and the free spaces 24, 26 such that the desired temperature equalization is effected. This occurs in that the free spaces 24, 26 are configured asymmetrically in relation to a centre plane 32. In the embodiments represented in the figures, the free spaces have different radii of curvature in the transition region between the supporting elements 36 and the plates 12' and 14' that form the friction paths. In the figures, circles are drawn by means of dashes and diagrammatically represent the respective radii of curvature in the said transition regions. In the case of a column-shaped configuration of the supporting elements 36, the transition regions are rotationally symmetrical about the longitudinal axes of the supporting elements (these longitudinal axes are perpendicular to the plane 32).

As is represented, the transition region of a supporting element 36 in the direction of the inner plate 12' has a markedly greater radius of curvature, corresponding to the diameter D2 of the illustrated circle, than the transition region of the supporting element on the outer side into the outer plate 14', corresponding to the diameter D1. This achieves two things with regard to the desired purposeful influencing of the heat flow.

Firstly, the flow cross section that is available for the flow of heat in the metal of the brake disc from the friction path into the supporting element is greater on the side to be cooled to a greater extent, here therefore the side of the inner friction path 12, than on the other side, here the outer side 22, of the brake disc.

Secondly, the flow of the cooling air in the free spaces 24, 26 is influenced in such a way that on the side of the brake disc that is to be cooled to a greater extent, here therefore the side 20 of the inner friction path 12, more heat is absorbed by the air stream than on the other side of the brake disc, in the present embodiment therefore on the side 22 of the outer friction path 14. The cooling effect of the air flow may be adjusted asymmetrically in the free spaces 24, 26 on both sides of the brake disc in particular in that turbulences purposefully arise on the side of the brake disc that has to be cooled to a greater extent than the other side of the brake disc, on which the flow is then preferentially rather a laminar flow.

The two previously described effects may be used both individually and in combination to achieve as a whole the desired temperature distribution at, and in, the brake disc. The configuration of the contours of the free spaces 24, 26 and the configuration of the shapes of the supporting elements in relation to the transition regions into the plates 12', 14' is to be empirically optimized in the context of defined estimations for a given brake disc of specific dimensions and materials.

For example, for a given brake disc, the dimensions of which are described in detail further below, transition radii for the side of the outer friction path 14 of between 1 and 2.5 mm and transition radii on the other side, i.e. on the side of the inner friction path 12, in the region of between 3.5 and 6 mm were determined as highly suitable. These transition radii are indicated in the figures by the dashed circles, which have respectively the diameters D1 and D2.

As already explained in the introduction, here the term "transition radius" stands not necessarily for an exact circular shape but for a curved shape, which may also deviate from the more exact circular shape. The curved shape may also be angular, i.e. polygonal. The essential point is that at least one of the two previously mentioned technical effects, i.e. with regard to the heat flow cross section in the supporting elements and/or with regard to the heat absorption in the air flow, is achieved.

Instead of the curved configurations of the transition regions in question, bevelled shapes, for example conical shapes, may also be provided. For example, the transition regions of the supporting elements into the plates may have bevels in relation to the plane 32, geometrically comparable for example to a chamfer that is arranged at the free spaces, in which case—analogously to the ratio of the previously described radii of curvature—on the side of the brake disc that is to be cooled to a greater extent the cross section in the supporting element 36 is to be made greater for the purpose of an increased heat flow.

Instead of the previously described column-shaped developments of the supporting elements 36, these may also take the form of short ribs or the like, in which case corresponding asymmetries are provided on both sides of the plane 32 in order to achieve the previously described effects.

As the brake disc 10 in the illustrated embodiment is cast and has the free spaces 24, 26 for the ventilation, the core parting plane typically extends through the supporting elements 36. This facilitates a form of construction, which has already been indicated above, having two double cones in such a way that from the parting plane one cone extends in a widening manner to the inner friction path 12 and the other cone extends in a widening manner to the outer friction path. By selection of the cone angles the heat flow may be controlled in the above sense.

A further means of controlling the heat flow is the configuration of the connection 18 and the transition 34 as well as of the brake disc in the region of the air inlet 28. Thus, for example, the originally supporting cross section of the connection 18 may be partially or even entirely replaced by means of ribs 28, wherein to achieve the heat flow control the transition 34 is then adapted both in cross-sectional thickness and also in terms of its length. Holes may also be provided in the transition region 18 to reduce the heat flow. On the whole, for a given structure of a brake disc the interplay of the individual heat flows has to be adapted to achieve the previously described objective of optimum heat distribution at, and in, the brake disc.

Another objective when designing advanced brake discs is to make it easy for technicians to detect the end of the service life of a brake disc. The end of the service life of a brake disc is generally indicated by crack formation. In this sense it is advantageous to design the heat conditions and stress conditions in the brake disc in such a way that the crack formation towards the end of the service life of the brake disc is detectable at the outer friction path (because this is easier to perceive). Critical are in particular crack formations in the radially inner region of the brake disc 10 because this poses the risk that the brake disc will burst (split). It is therefore desirable to design the brake disc, in particular as described above on page 8, first paragraph (Trans: page 10, last paragraph of English translation), in such a way that towards the end of the service life crack formation first occurs, if at all, approximately in the centre of the outer friction path. In order to achieve this, according to a special development of the brake disc it is provided that the central region of the disc is exposed to higher thermal cycling than other regions situated radially further in or out. For this purpose, in the central radial region of the friction paths the heat conduction cross sections (accordingly therefore the transition radii) may be configured in such a way that in this central region the heat transfer from the outer friction path is somewhat reduced. The same effect may also be achieved by somewhat reducing the density of the supporting elements 36 in the radially central region of the friction paths.

The following geometric dimension have proved advantageous for a brake disc of the previously described type.

In a brake disc having a diameter in the range of 300 to 360 mm, the supporting elements lie on three circles (in accordance with FIG. 1). The number of supporting elements 36, in particular on the outer circle, is so selected that the vibration modes of the brake disc are as far away as possible from natural frequencies of other components of the disc brake, in which the brake disc is fitted. In a brake disc having a diameter of for example 320 mm that is provided for a 16" wheel rim, there are situated in the outer circle approximately 50 supporting elements 36, in the middle circle approximately 45 supporting elements and in the inner circle approximately 35 to 45 supporting elements.

FIG. 2 shows a modified brake disc having a so-called swan neck 34a. Otherwise, in the figures functionally identical or functionally equivalent components are provided with identical reference numerals, supplemented in FIG. 2 by an "a".

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A brake disc for a disc brake having an outer friction path on one side and an inner friction path on the other side of the brake disc and having air-swept hollows between the friction paths for cooling the brake disc, having an outer plate, which forms the outer friction path, and an inner plate, which forms the inner friction path, wherein one of the outer and inner plates is connected to a heat-removing brake disc pot by a connecting member which runs integrally into the one of the outer and inner plates and the other one of the outer and inner plates is connected to the one of the outer and inner plates by supporting elements whereby the one of the outer and inner plates is located closer to the brake disc pot than the other one of the outer and inner plates, wherein each hollow of the one of the outer and inner plates which is located closer to the brake disc pot has a radius of curvature in a transition region of the supporting elements into the one of the outer and inner plates which is smaller than a radius of curvature in a transition region of the supporting elements into the other one of the outer and inner plates, wherein the supporting elements are column-shaped and allow radial airflow from a first of the hollows to a second of the hollows, wherein the outer and inner plates have approximately a same thickness.

2. A brake disc according to claim 1, wherein the hollows in a radially central region of the friction paths are configured in such a way that in a central region the heat removal from the outer friction path is slightly reduced to such an extent relative to the heat removal from the inner friction path that any crack after extreme wear of the brake disc starts at the outside in the radially central region of the friction path.

3. A brake disc for a disc brake having an outer friction path on one side and an inner friction path on the other side of the brake disc and having air-swept hollows between the friction paths for cooling the brake disc, having an outer plate, which forms the outer friction path, and an inner plate, which forms the inner friction path, wherein one of the outer and inner plates is connected to a heat-removing brake disc pot by a connecting member which runs integrally into the one of the outer and inner plates and the other one of the outer and inner plates is connected to the one of the outer and inner plates by supporting elements whereby the one of the outer and inner plates is located closer to the brake disc pot than the other one of the outer and inner plates, wherein each hollow of the one of the outer and inner plates which is located closer to the brake disc pot has a radius of curvature in a transition region of the supporting elements into the one of the outer and inner plates which is smaller than a radius of curvature in a transition region of the supporting elements into the other one of the outer and inner plates, wherein the supporting elements are column shaped and allow radial airflow from a first of the hollows to a second of the hollows, wherein each column-shaped supporting element has a longitudinal axis that is perpendicular to a plane, which extends parallel to the friction paths, wherein the transition regions at each column-shaped supporting element are rotationally symmetrical about the respective longitudinal axis.

* * * * *